United States Patent [19]

Moody

[11] 3,710,897
[45] Jan. 16, 1973

[54] SELF-ADJUSTING POWER OPERATED BRAKE

[75] Inventor: John K. Moody, Milwaukee, Wis.

[73] Assignee: Harnischfeger Corporation, Milwaukee, Wis.

[22] Filed: June 28, 1971

[21] Appl. No.: 157,184

[52] U.S. Cl.................188/75, 188/79.5, 188/196 V
[51] Int. Cl..........................F16d 51/00, F16d 65/38
[58] Field of Search..............188/196 V, 75, 203 GT, 198–202, 188/79.5

[56] References Cited

UNITED STATES PATENTS 1,158,177  10/1915  Christenson......................188/196 V
3,106,265  10/1963  Driesch................................188/75
1,274,865  8/1918  Everett...........................188/196 V

FOREIGN PATENTS OR APPLICATIONS 514,127  6/1955  Canada............................188/196 V Primary Examiner—Richard E. Aegerter
Assistant Examiner—H. S. Lang
Attorney—James E. Nilles

[57] ABSTRACT

A power operated brake of the type having self-adjusting brake shoes which are opened by power means and closed by spring means relative to the wheel being braked. The brake includes means for automatically adjusting the brake shoes to compensate for wear thereof. The self-adjusting means includes a series of shims which automatically move into slack take-up position when sufficient wear occurs in the shoe.

6 Claims, 3 Drawing Figures

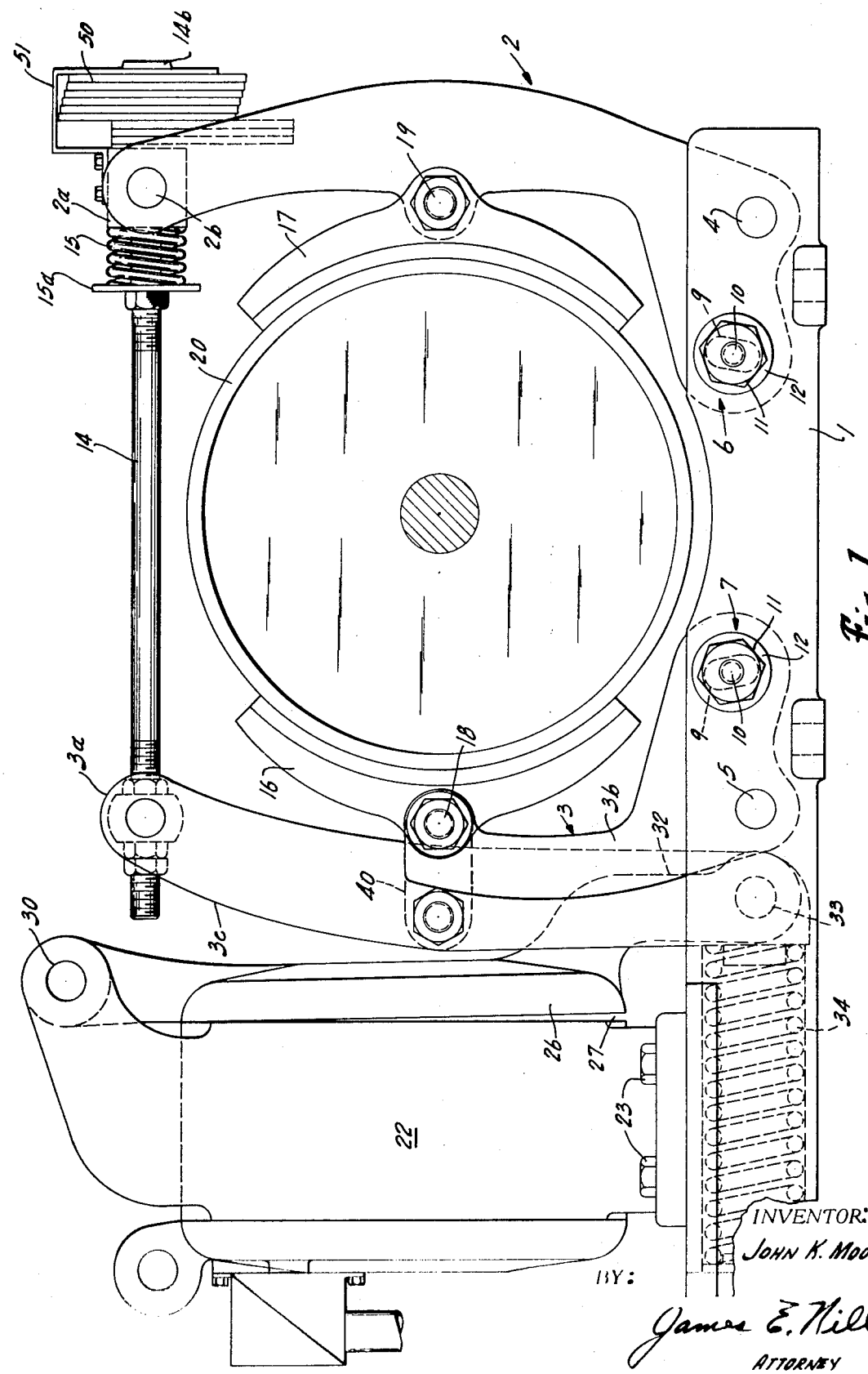

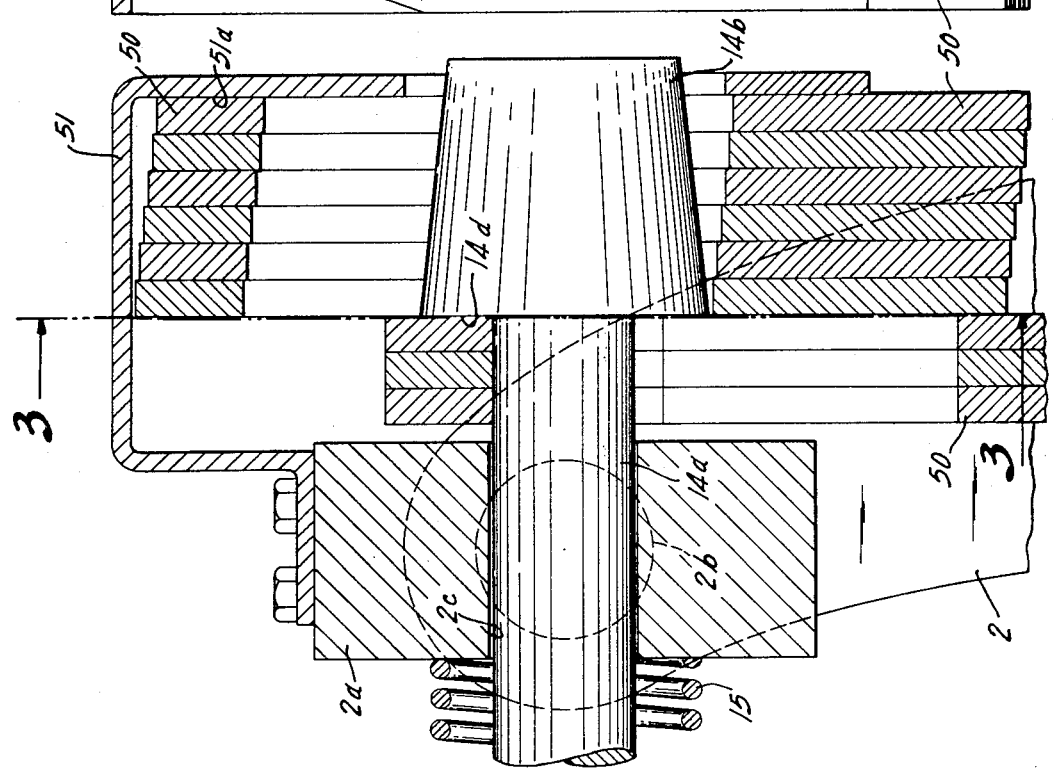

SELF-ADJUSTING POWER OPERATED BRAKE

BACKGROUND OF THE INVENTION

The invention pertains to power operated brakes having self-adjusting brake shoes and more particularly to means for taking up the slack in the connecting rod between the brake shoes when the brake shoes wear sufficiently.

The present invention is an improvement over the mechanism shown in the U.S. Pat. No. 3,349,873, which issued Oct. 31, 1967 to Wycoff et al. and entitled "Self-adjusting Power Operated Brake," which patent has been assigned to an assignee common with the present invention. In that prior art device, the power operating means for shifting the brake shoes comprised a hydraulic cylinder and piston unit and functioned satisfactorily for the purposes for which it was intended. However, with the use of other power operated devices for actuating the brake shoes, such as a spring biased magnet and armature arrangement, when the brake shoes wore, the connecting rod between the brake shoes required adjustment so that the air gap between the armature and magnet did not become excessively large and render the power means inoperative.

SUMMARY OF THE INVENTION

The present invention provides a power operated brake mechanism having self-adjusting brake shoes which are connected together so that the braking force is provided by a spring means and is applied equally by the shoes. Power operated means are provided for simultaneously shifting the brake shoes out of engaging position. More specifically, the invention provides a mechanism of this type which includes means for effectively shortening the length of the connecting rod between the brake shoes when the brake shoes wear sufficiently and this means includes a series of shims which will automatically fall into proper position when sufficient wear of the brake shoes occurs.

A more specific aspect of the invention relates to a particular means for mounting the series of shims so that they will fall into their slack take-up position only when sufficient wear of the shoes occurs, thereby eliminating malfunction of the adjusting mechanism.

A still further aspect of the invention relates to an adjusting mechanism of the above type including an electro-magnet and armature arrangement for power operating the brake shoe arms and in which the air gap between the electro-magnet and armature is maintained within good operating limits.

These and other objects and advantages of the present invention will appear hereinafter as this disclosure progresses, reference being had to the accompanying drawings.

BRIEF DESCRIPTION OF THE DRAWINGS

FIG. 1 is an elevational view, partially in section, of the brake mechanism made in accordance with the present invention;

FIG. 2 is an enlarged, fragmentary, cross sectional view of the self-adjusting means shown in FIG. 1; and FIG. 3 is a sectional view taken generally along the line 3—3 in FIG. 2.

DESCRIPTION OF THE PREFERRED EMBODIMENT

The brake mechanism includes a base 1 which is adapted to be secured rigidly to the frame of the vehicle to be braked, such as a crane shown in said U.S. Pat. No. 3,349,873. A pair of brake arm means 2 and 3 are pivotally mounted on the base 1 and have free ends 2a and 3a, respectively. Compound arm means 3 is comprised of an arm 3b pivoted to the base at 5 and an arm 3c having a floating lower pivot, as will appear. Arm means 2 is pivoted to the base at 4.

Between each of the arms 2 and 3b and the base there is also provided a yieldable and self-adjusting pin and slot connection 6 and 7. If a complete description of these self-adjusting pin and slot connections are deemed to be either necessary or desirable, reference may be had to the said U.S. Pat. No. 3,349,873, but it is believed sufficient to say that they each include an elongated slot 9 in the base and a round hole 10 in the arms, and a bolt means 11 extends through the aligned hole and slot. Belleville washer means 12 are also provided in this connection and thus the bolt means 11 and the base normally function as a single unit. The degree of compression of the Belleville springs can be varied by adjusting the nut on the bolt means. This geometrical arrangement is the converse of U.S. Pat. No. 3,349,873, wherein the elongated slot is in the arm and the round hole is in the base; however, the operating principle is the same, that is, the pin yields and assumes a new position under the brake engaging pressure as the brake shoes wear, and then the pin serves as an unyielding stop for the brake shoe support arms to rest against when the brake is disengaged. Thus, the brake shoe support arms oscillate only in the amount of the clearance between the bolt means and the hole 10.

A connecting rod 14 is pivotally secured between the upper ends of the brake shoe arms 2 and 3c. The function of this connecting rod is to insure that the brake shoe arms simultaneously apply or release their respective brake shoes 16 and 17. The brake shoes 16 and 17 are conventional and are pivoted, respectively, on their pivot shafts formed by bolt means 18 and 19 fixed on arms 3b and 2.

The connecting rod 14 is slideably as well as pivotally connected to the free end of arm 2 by means of a block 2a pivoted on arm 2 by trunions 2b, and the rod 14 slides in a hole 2c in the block. The rod has a portion 14a extending through the block and an enlarged tapered segment 14b on the end thereof. Thus the rod can slide in one direction through the block but is prevented from sliding through the block in the other direction due to the enlarged segment 14b. A spring 15 acts between the block and a washer 15a fixed to the rod to thereby tend to urge the segment 14b against the block thereby forcing arms 2 and 3b against their respective stops formed by connections 6 and 7 in the brake disengaged position.

Power operated means are provided for swinging the brake arm means and their shoes to a position in which the brake shoes are retracted from the wheel 20 slightly so as to release the wheel.

This power operated means includes a large electromagnet 22 which is rigidly mounted by bolt means 23 to the base 1. The power operated means also includes a shiftable armature 26 which is actuated by energization of the magnet, and an air gap 27 is provided between the armature 26 and the magnet 22. In order for this power operating means to function properly, the air gap 27 cannot become excessively large, for example as would happen when the brake shoes wear excessively, as will be explained more fully.

The armature 26 is pivotally mounted at 30 on the main frame of the magnet and can swing about that pivot point, for example, to the right as viewed in the drawings when the brake is to be engaged, that is when the brake shoes are to be clamped against wheel 20. The armature 26 can also swing to the left when the magnet is energized to the brake releasing position.

More specifically, the armature 26 includes a downwardly extending central arm 32 which is pivoted by a pin 33 to the lower end of the brake arm 3c. A large spring 34 acts between the base 1 and the lower end of arm 32 and urges the armature 26 away from the magnet and consequently also urges the lower end of arm 3c to the right. As will appear, the spring thus acts to normally cause the brake shoes to be engaged. Energization of the electro-magnet 22 on the other hand, causes the armature 26 to retract to the brake disengaging position.

The arms 3b and 3c of the compound arm 3 are connected together as follows. A single, centrally located link 40 is pivoted on the shaft 18 which also pivots the brake shoe 16, and the other end of the link is pivoted to the bolt means 41 that extends through the intermediate portion of the arm 3c. Thus the link 40 connects the two arms 3b and 3c together, but at the same time permits them to swing about their different pivot points.

In operation, the brake is normally engaged by the action of the large spring 34 which urges the lower end of the brake arm 3c to the right, thereby also urging the upper end of brake arm 3b and its attached shoe to the right or to the wheel engaging position. At the same time, the arm 3c pivots intermediate its length, thereby causing its upper end to move to the left, pulling with it the connecting rod 14 and the upper end of brake arm 2. Thus, the brake shoe 17 is simultaneously clamped against wheel 20. As previously mentioned, connections 6 and 7 yield under this brake clamping pressure and assume a new position as the brake shoes wear.

In order to effect brake release from the normally engaged position, the electro-magnet is energized which causes retraction of the armature 27 to the left, as viewed in the drawings. This movement simultaneously causes the lower end of arm 3c to move to the left away from the wheel, carrying with it the upper end of arm 3b and the brake shoe 16. As arm 3b comes to rest against the stop formed by connection 7 which now does not yield, arm 3c pivots about the link 40, causing the upper end of arm 3c to shift to the right and consequently pushing rod 14 to the right. This causes the other brake arm 2 to swing to the right about its pivot point 4 until it comes to rest against the stop formed by connection 6 which also does not yield, thereby releasing shoe 17 from the wheel. Any further movement to the right by rod 14 compresses spring 15 sliding portion of rod 14a through hole 2c in block 2a thereby moving the enlarged tapered segment 14b to the right, a portion of which moves past bracket 51, as will appear.

With the above described brake shoe compound arm and brake shoe actuating mechanism, a particularly good mechanical leverage is provided for the mechanism.

The previously mentioned retarding spring 15 acts to free the brake shoes 16 and 17 from the wheel and force arm 2 and 3b against their respective stops formed by connections 6 and 7; that is to say the spring acts to insure positive release of the brake shoes when the magnet 22 is energized and the armature 26 shifts as above mentioned.

Means are provided between the connecting rod 14 and the brake arm 2 so that as the brake shoes wear, the effective length of rod 14 becomes shorter. For this purpose, the free end of the brake arm 2 has a connection with the connecting rod so that the rod is slideably mounted on the free end of arm 2, for example by having the connecting rod 14 slideably extending through the block 2a, as previously mentioned. A series of corrosion resistent shims 50 are mounted on the enlarged segment 14b of the connecting rod and are retained by a bracket 51 attached to the block 2a. It will be noted that the shims 50 each have a generally key shaped opening which includes a generally circular opening 52 and an upwardly extending narrower opening 53. The circular opening 52 is of such size that the shims 50 may be loosely mounted on the largest portion of the enlarged segment 14b. The enlarged segment 14b also forms a shoulder 14d which prevents withdrawal in one direction of the connecting rod 14 through the block 2a.

The shims are so shaped, as shown in FIG. 3 that the center of gravity of the shims is located below the midpoint height of the shims. This shape insures that the shims hang in the proper position.

If the brake shoes 16 and 17 have worn sufficiently when the rod 14 is pushed through the block 2a thereby pushing a portion of enlarged segment 14b past the outer end 51a of bracket 51 a predetermined normal clearance distance plus the thickness of one shim, the shoulder 14d is spaced from the block 2a a sufficient distance so that the end-most shim drops down over the rod 14. That is to say, the narrow portion 53 of the shim opening drops down and embraces the rod 14. As shown in the drawings, three of the shims have been pushed off the enlarged segment 14b, due to movement of the rod 14 through the block in the one direction to the right. The shims which have then been shifted into engagement with that portion of the rod which extends through the block 2a, prevent the rod from being withdrawn in the opposite direction through the block 2a, thereby shortening the effective length of the rod between the free ends of the brake arms 2 and 3c.

It will be noted that the enlarged segment 14b is tapered so that the shims which are not acting to effectively shorten the rod are maintained against the outer end 51a of the bracket 51.

With this construction, the innermost shim on the enlarged segment 14b will not drop into the space between the block 2a and the shoulder 14d until sufficient clearance is available therebetween to permit the innermost shim to drop freely over the rod 14. In this manner, one of the shims falls down into place only after sufficient wear of the shoes occurs and the shim thus takes up the slack in the mechanism. With this construction, a self-adjusting mechanism readjusts the brakes to maintain the air gap 27 to a sufficiently small size to insure proper operation of the magnet and armature.

I claim:

1. In an automatically self-adjusting brake mechanism of the type having a base, a pair of brake shoe arm means pivotally mounted at one end to said base and terminating in free ends, one of said arm means being located on each of opposite sides of a wheel to be braked and swingable between brake engaged and disengaged positions, a connecting rod having a connection to and extending between the free ends of said arm means, said rod being in tension when said arm means are swung to said brake engaged position, one of said connections comprises said rod being slideably mounted on one of said free ends and having a portion extending therethrough, a series of shims associated with said free end and adjacent said portion whereby when said portion moves in one direction a predetermined amount through said free end toward said brake disengaged position, one of said shims will automatically fall into engagement with said portion and prevent movement of said portion in the other direction relative to said free end, thereby shortening the effective length of said connecting rod between said free ends of said pair of arm means.

2. The mechanism set forth in claim 1 further characterized in that said portion has an enlarged segment, said shims are carried on said segment, and when said portion moves said predetermined amount in said one direction, one of said shims is pushed off said segment and shifts between said segment and said free end.

3. The mechanism set forth in claim 1 wherein one of said arm means comprises a first arm pivotally mounted at one end on said base, a brake shoe pivotally mounted on the other end of said first arm for engagement with the wheel to be braked, a second arm having a pivotal connection intermediate its length with said first arm, said second arm at one end having said connection with said connecting rod, means for shifting the other end of said second arm in a brake applying direction, and power means for shifting said other end of said second arm in the opposite, brake releasing position.

4. The mechanism set forth in claim 3 wherein said power means includes an electro-magnet, an armature actuated by said electro-magnet, said armature being connected to said other end of said second arm whereby energization of said magnet acts to shift said armature and said second arm to said brake releasing position.

5. The mechanism set forth in claim 3 further characterized in that said portion has an enlarged segment, said shims are carried on said segment, and when said portion moves said predetermined amount in said one direction, one of said shims is pushed off said segment and shifts between said segment and said free end.

6. An automatically self-adjusting brake mechanism having a base, a pair of brake shoe arm means having a pivotal connection at one of their ends to said base and terminating in free arm ends, said pivotal connections each being a yieldable and self-adjusting pin and slot connection, one of said arm means being located on each of opposite sides of a wheel to be brake and swingable between brake engaged and non-engaged positions, a connecting rod having a connection to and extending between the free ends of said arm means, said rod being in tension when said arm means are swung to said brake engaged position, one of said connections comprising said rod being slideably mounted on one of said free ends and having a portion extending therethrough, a series of shims associated with said free end and adjacent said portion whereby when said portion moves in one direction a predetermined amount through said free end, one of said shims will drop by gravity into engagement with said portion and prevent movement of said portion in the other direction relative to said free end, thereby shortening the effective length of said connecting rod between said free ends of said pair of arm means.

* * * * *